United States Patent [19]

Rashid

[11] 3,898,652
[45] Aug. 5, 1975

[54] VEHICLE SAFETY AND PROTECTION SYSTEM

[75] Inventor: George E. Rashid, St. Clair Shores, Mich.

[73] Assignee: Mary D. Rashid, St. Clair Shores, Mich.

[22] Filed: Dec. 26, 1973

[21] Appl. No.: 427,653

[52] U.S. Cl. ............... 343/6 R; 180/98; 343/7 ED
[51] Int. Cl. ...................... G01s 9/02; B60t 7/12
[58] Field of Search .......... 343/6 R, 7 ED; 180/98

[56] References Cited
UNITED STATES PATENTS

| | | | |
|---|---|---|---|
| 3,697,985 | 10/1972 | Faris et al. | 343/7 ED X |
| 3,710,383 | 1/1973 | Cherry et al. | 343/7 ED |
| 3,820,622 | 6/1974 | Powell | 343/7 ED X |

Primary Examiner—T. H. Tubbesing

[57] ABSTRACT

A vehicle safety system for detecting the presence of objects in the vicinity of the vehicle and for producing an indication upon the detection of the objects. The system comprises a front sensor and rear sensor each of which includes a Doppler radar and side sensors which include proximity radars. The system also includes a vehicle velocity sensor which senses the velocity of the vehicle and produces an output indicative thereof. A signal processing unit receives the outputs of the front and rear sensors and the vehicle velocity sensor and produces an output which is indicative of the vehicle's capability of stopping prior to colliding with an object detected in front of the vehicle, and also produces an output indicative of the range and closing speed of an object detected to the rear of the vehicle. An indicator is coupled to the signal processing unit and produces a signal indicative of the signal processor output, and signals indicative of the location of an object alongside the vehicle. The output of the processing unit may also be applied to the vehicle brake and accelerator controls for slowing down the vehicle if the operator does not respond properly to a warning signal generated by the indicator.

5 Claims, 7 Drawing Figures

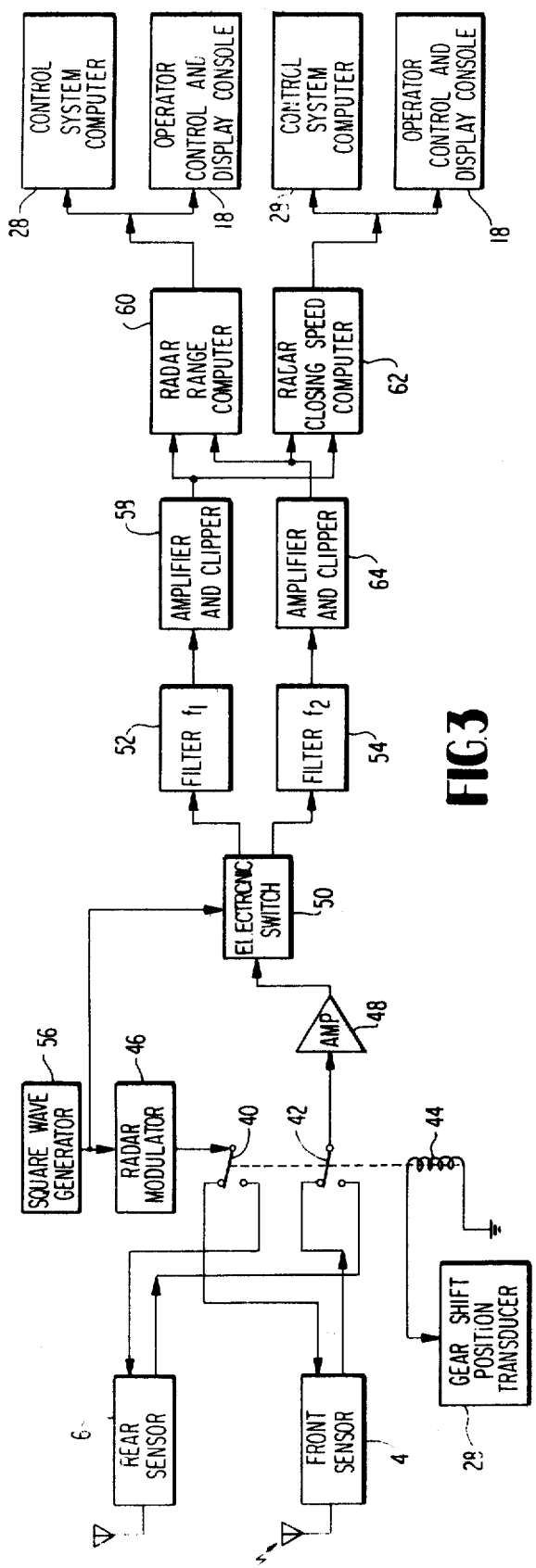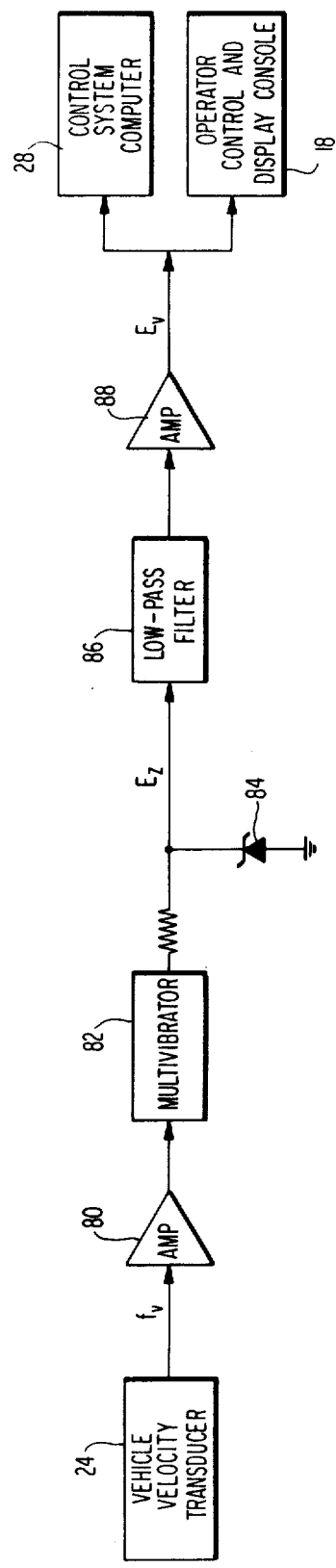

3,898,652

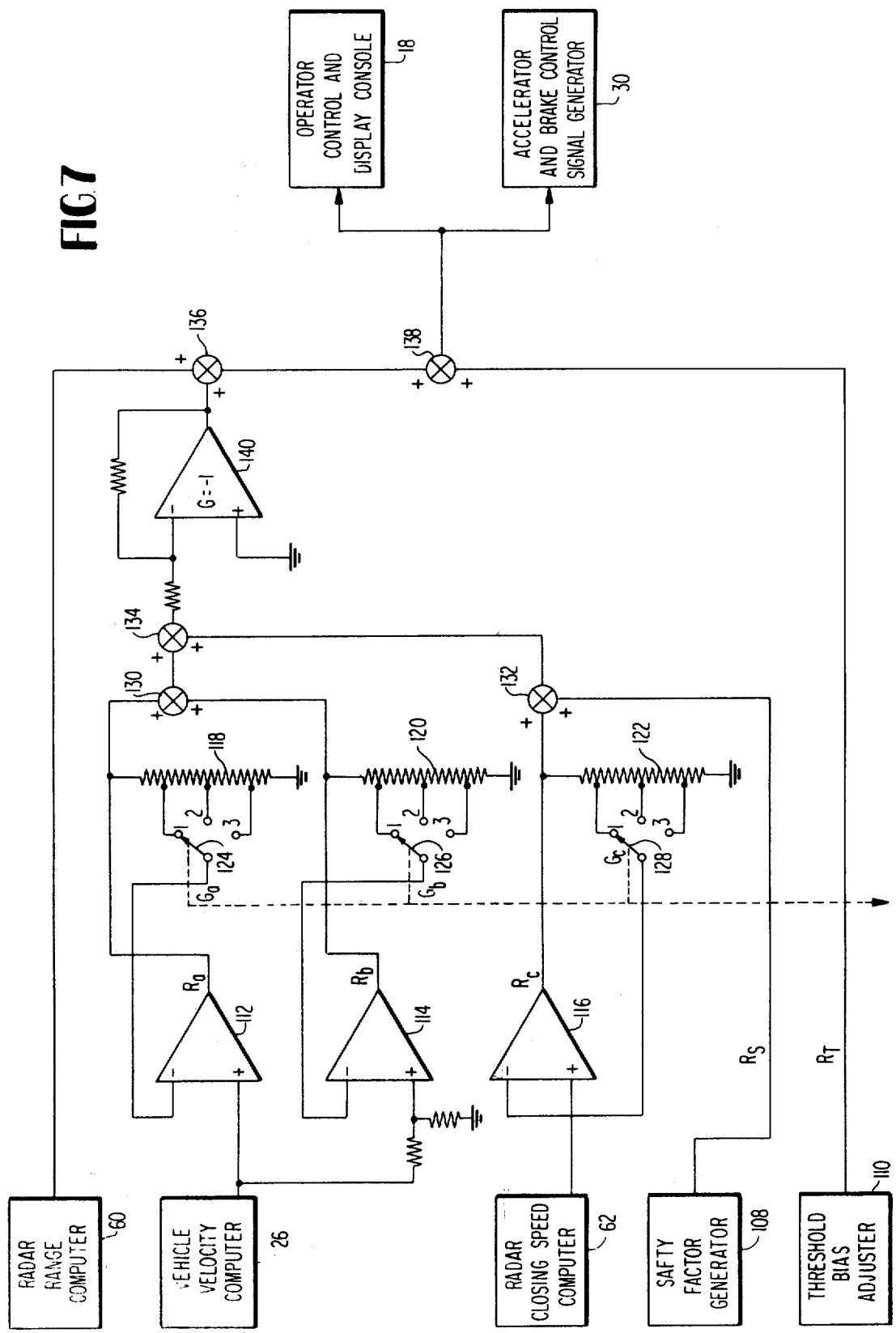

VEHICLE SAFETY AND PROTECTION SYSTEM

BACKGROUND OF THE INVENTION

1. Field of the Invention

This invention relates to a vehicle safety system and more particularly to a vehicle safety system which includes sensors on the front, rear and sides of the vehicle to locate objects surrounding the vehicle and to provide indications and control of the vehicle in accordance with the detection of objects around the vehicle.

2. Description of the Prior Art

Radar systems for controlling vehicles in response to the detection of objects in front of the vehicle are broadly known in the art. However, in today's crowded conditions the detection of objects on the sides of the vehicle and to the rear of the vehicle is very important in order to drive the vehicle safely. Because of the limited field of vision of mirrors and the blockage of areas by pillars and posts in a car, several blind spots exist where a driver cannot readily observe objects, such as other vehicles, with which a collision may occur. Trucks and cars pulling trailers also have blind spots to the rear. The existence of blind spots can be very hazardous when driving in congested areas.

SUMMARY OF THE INVENTION

It is the primary object of this invention to provide sensors which detect objects located in the driver blind spots and to provide an indication when a vehicle is too close to detected objects.

It is another object of this invention to provide means for calculating the safe stopping distance to an object in front of the vehicle and to compare this distance with the actual distance to the object.

It is still another object of this invention to provide means for calculating the safe stopping distance, taking into consideration factors based upon one car length for every 10 miles per hour of the vehicle, the distance traveled during the reaction time of the driver, and the velocity at which the vehicle is closing upon an object in front of it. These various factors are modified in accordance with the existing road conditions, e.g., dry, wet, or ice.

It is still another object of this invention to provide means for automatically controlling the vehicle accelerator and brake system when the vehicle is too close to an object in front of it.

It is a further object of this invention to provide a Doppler radar system for detecting the range and closing speed of objects located in front of and to the rear of the vehicle.

It is still a further object of this invention to provide a proximity radar system for detecting the presence of objects located to the side of the vehicle.

This invention may be briefly summarized as a vehicle safety system for detecting the presence of objects in the vicinity of a vehicle and for producing an indication upon the detection of the objects. A front sensor including a Doppler radar detects the range and closing velocity of the vehicle with respect to an object located in front of the vehicle. A vehicle velocity sensor senses the velocity of the vehicle. The velocity of the vehicle is used to calculate a distance which, under existing conditions, is the minimum safe distance which the vehicle should be from the object. This distance includes a first factor which is equal to one car length for every 10 miles per hour that the vehicle is traveling, a second factor equal to the distance which the vehicle will travel during the reaction time of the driver, a third factor equal to the distance traveled due to the closing speed of the vehicle relative to the object in front of it, and a fourth factor which is a predetermined safety factor. The sum of these factors is compared with the range of the object in front of the vehicle. If the sum of the factors is greater than the range of the object, then the vehicle is too close to the object and should be slowed down. The system produces a warning just prior to the existence of this condition, and, if the driver of the vehicle does not react by slowing down the vehicle to increase the distance, then the system generates a signal which is used to control the vehicle brake and accelerator. The various factors are computed based upon the road conditions. Therefore, if the road is wet rather than dry, a greater stopping distance is required. If the road is icy, a still greater stopping distance is required.

The system also has a rear sensor which includes a Doppler radar for detecting the range and closing speed of an object to the rear of the vehicle. The range and closing speed are displayed on an indicator to the driver of the vehicle. This information may be used, when the vehicle is in reverse, to warn the driver of an impending collision with an object to the rear of the vehicle which cannot be seen by the driver. The rear sensor and indicator also are useful, when the vehicle is moving in the forward direction, to indicate to the driver that a vehicle behind him is not a safe distance to the rear. This information can be used to provide a warning to the following vehicle.

The system further includes side sensors which use proximity radars. These radars calculate distance based on the attenuation of a reflected signal. The side sensor has application in warning the driver of a possible sideswipe when the vehicle approaches an object to its side. The radiation patterns of the side radars cover blind spots on the sides of the vehicle. These blind spots typically occur at points not covered by rear view mirrors and which may be blocked by pillars or supports within the vehicle.

BRIEF DESCRIPTION OF THE DRAWINGS

FIG. 3 is a block diagram of the Doppler radar used in the preferred embodiment.

FIG. 5 is a block diagram of the vehicle velocity sensor used in the preferred embodiment.

FIG. 7 is a block diagram of the signal processing unit used in conjunction with the preferred embodiment.

DESCRIPTION OF THE PREFERRED EMBODIMENT

Figure 1:
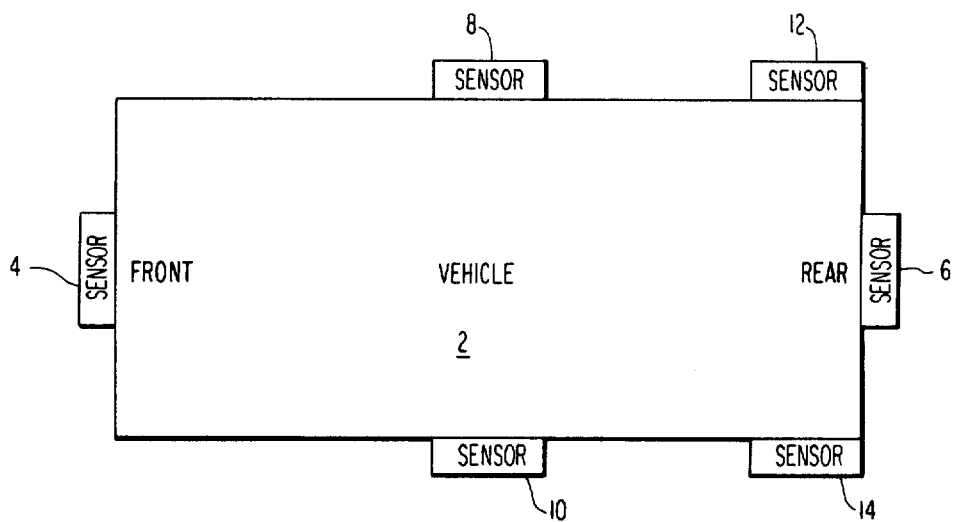
FIG. 1 is a block diagram of a vehicle and the location of the sensors on the vehicle in accordance with the preferred embodiment of the present invention.

FIG. 1 shows a vehicle 2 and the location of the sensors for detecting objects around the vehicle. Sensor 4 is the front sensor and is located in the front of the vehicle for detecting objects in front of the vehicle. Rear sensor 6 is positioned to detect objects to the rear of the vehicle. Side sensors 8 and 10 are positioned at approximately the middle of the sides of the vehicle to detect objects in a blind spot occurring to the side of the vehicle, while sensors 12 and 14 are located at the side rear of the vehicle to detect blind spots to the side of the vehicle near its rear.

Figure 2:
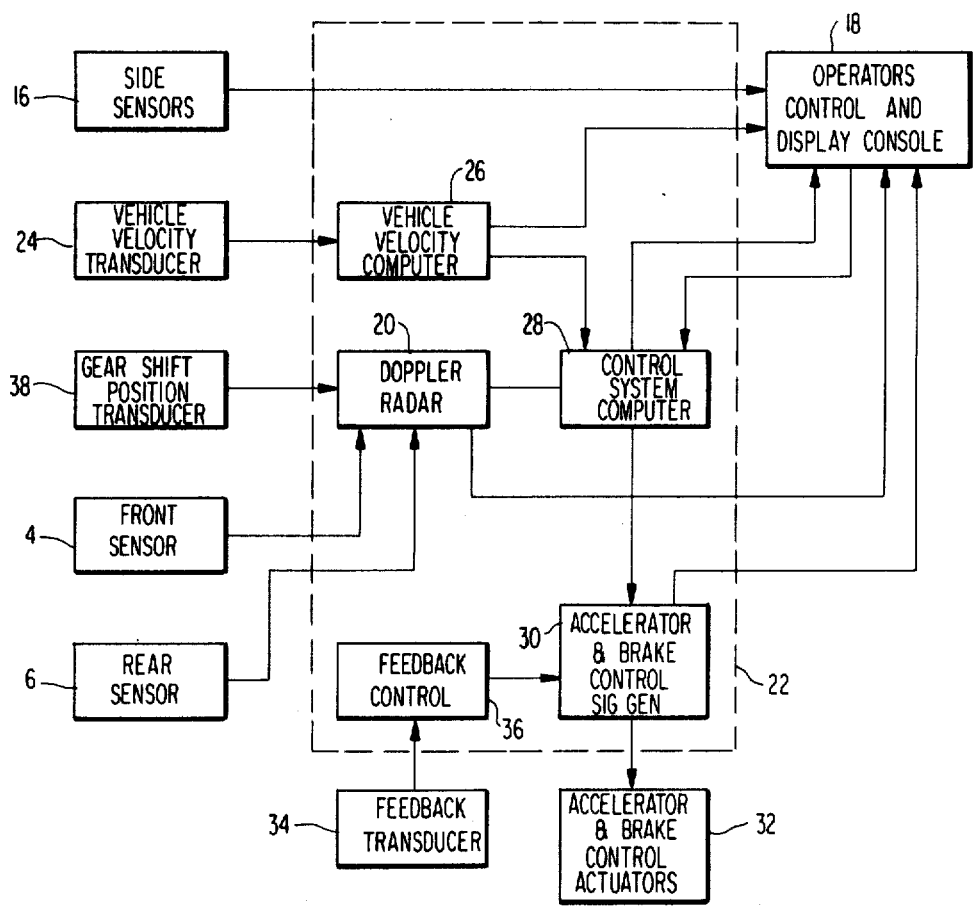
FIG. 2 is a system block diagram of the preferred embodiment of the present invention.

Referring to FIG. 2, side sensors 8, 10, 12 and 14 are represented by block 16. All of the side sensors are connected to the operator control and display console 18 and provide an indication at the console of the detection of an object at any or all of the side sensors. Front sensor 4 and rear sensor 6 are each connected to Doppler radar unit 20 which is part of the signal processing control assembly 22. A vehicle velocity transducer 24 generates a signal which is indicative of the velocity of the vehicle. This signal is applied to vehicle velocity computer 26 which computes the velocity of the vehicle based upon the output of the vehicle velocity transducer 24. One output from the vehicle velocity computer is applied to the operator control and display console 18 which produces an indication of the vehicle velocity. Another output from vehicle velocity computer 26 is applied to control system computer 28. The control system computer computes the distance required for the vehicle to stop based on existing road conditions and the velocity of the vehicle and compares this to the range of an object in front of the vehicle. This range is computed by the Doppler radar. Based upon the comparison, the control system computer produces an output which is indicative of the vehicle's ability to stop prior to colliding with the object in front of the vehicle. This output is applied to the operator control and display console 18 which produces an indication to warn the driver if the vehicle is approaching a distance, from the object in front of it, at which it will not be able to stop. The output of the control system computer is also applied to an accelerator and brake control signal generator 30 which generates a signal for controlling the vehicle accelerator and brakes 32 when the vehicle is too close to an object in front of it. Feedback transducer 34 and feedback control 36 provide an input to accelerater and brake control signal generator 30 to prevent skidding caused by over-applying the vehicle brakes. Gear shift position transducer 38 is used to switch Doppler radar 20 to the rear sensor 6 when the vehicle is placed in reverse. The gear shift position transducer 38 may be eliminated and Doppler radar 20 may produce signals indicative of both front and rear conditions simultaneously.

FIG. 3 shows a Doppler radar system which may be used for detecting the range and closing speed of objects to the front and rear of the vehicle. When contacts 40 and 42 of relay 44 are in the position as shown, front sensor 4 transmits a signal at a frequency $f_0$. This signal is generated by radar modulator 46. The transmitted signal is reflected off of an object located in front of the vehicle and is received by sensor 4 at a frequency $f_1$ greater than $f_0$ if the vehicle is moving faster than the object. The reflected signal is at a frequency $f_2$ which is less than $f_0$ if the object is moving faster than the vehicle. The difference between $f_0$ and $f_1$ or $f_0$ and $f_2$ is indicative of the relative velocity of the vehicle and the object. The reflected signal at a frequency $f_1$ or $f_2$ is detected by sensor 4 and applied through amplifier 48 and electronic switch 50 to filters 52 and 54. The switch 50 is controlled by the output of square wave generator 56 which also is used in conjunction with the radar modulator 46. Filter 52 is a band pass filter having its lowest frequency at $f_0$ while filter 54 is a band pass filter having its highest frequency at $f_0$. In this arrangement, if the vehicle is closing with respect to the object, that is, if the vehicle is moving faster than the object in front of it, a signal $f_1$ will be received by front sensor 4 and will pass filter 52. This signal is amplified and clipped by amplifier clipper 58 and applied to the radar range computer 60 and the closing speed computer 62. Since the signal is passed through filter 52, it can readily be determined by the closing speed computer that the vehicle is moving faster than the object. If, however, the object is moving faster than the vehicle, that is, there is a negative closing speed and the object is moving away from the vehicle, than no signal is passed through filter 52 but the signal is passed through filter 54 amplified and clipped by amplifier clipper 64 and applied to radar range computer 60 and radar closing speed computer 62. The outputs of radar range computer 60 and radar closing speed computer 62 are applied to the control system computer 28 and to the operator control and display console 18.

When the vehicle is in reverse, gear shift position transducer 38 operates to energize relay 44 thereby moving contacts 40 and 42 from their position shown in FIG. 3. When the contacts 40 and 42 are switched rear sensor 6 is coupled to the system for detecting objects to the rear of the vehicle. Under these conditions, the system operates as described above with respect to the front sensor except that the input is from rear sensor 6 rather than front sensor 4 and the output of radar range computer 60 and radar closing speed computer 62 are not applied to the control system computer. These signals are applied only to the operator control and display console 18.

If desired, the system could be modified to apply these signals to the control system computer so that, when the vehicle is in reverse, the control system computer can be used to apply a signal to the accelerator and brake control signal generator for controlling the vehicle accelerator and brake systems as is the case when the front sensor is used. The system could also be modified to eliminate relay 44 such that signals detected by the front and rear sensors are simultaneously applied to the system whereby the front and rear of the vehicle are simultaneously monitored.

Figure 4:
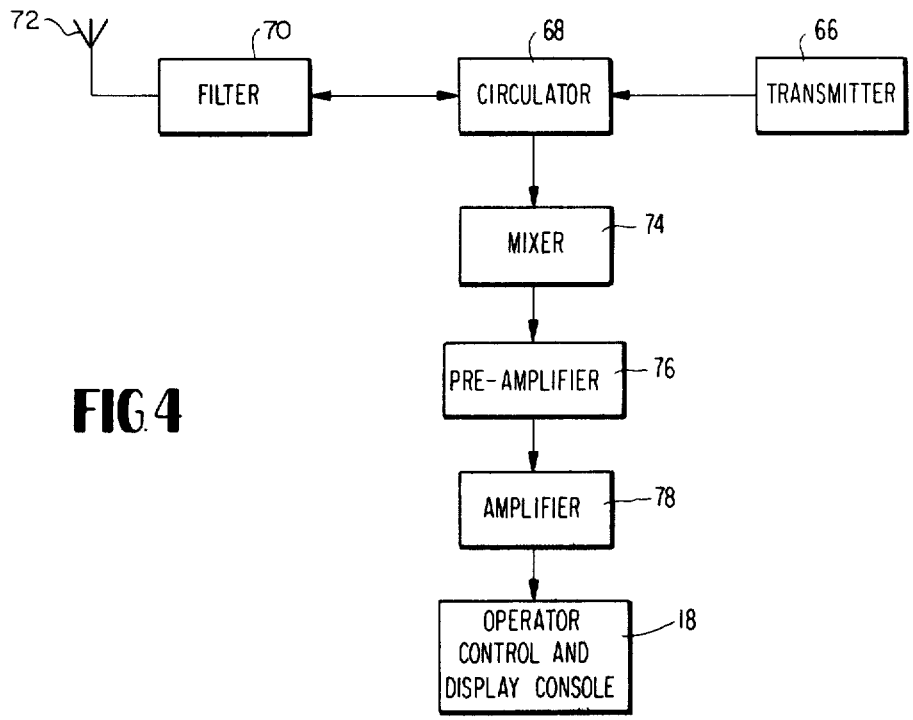
FIG. 4 is a block diagram of the proximity radar used in the preferred embodiment.

FIG. 4 shows a typical side sensor 16. This includes a radar transmitter 66, the output of which passes through circulator 68 and filter 70 to antenna 72. The signal radiated by the antenna is reflected off of an object and is received by the antenna 72, filter 70 and passes through circulator 68 to mixer 74, preamplifier 76 and amplifier 78. The output of amplifier 78 is applied to an indicator on the operator control and display console 18.

FIG. 5 is a block diagram of vehicle velocity computer 26. Vehicle velocity transducer 24 produces an electrical signal having a frequency $f_v$. This signal is applied to amplifier 80, the output of which is applied to a monostable multivibrator 82. The period of the multivibrator $t_0$ is equal to $1/f_v$. The output of multivibrator 82 is applied across zener diode 84 through a low pass filter 86 to amplifier 88. The output of amplifier 88, $e_v$, is equal to $e_z$, the voltage across zener diode 84, times $t_p$, the pulse width of the output of multivibrator 82. It can be seen that $e_v$ is a voltage representative of the velocity of the vehicle. The output of amplifier 88 is applied to control system computer 28 and to the operator control and display console 18.

Figure 6:
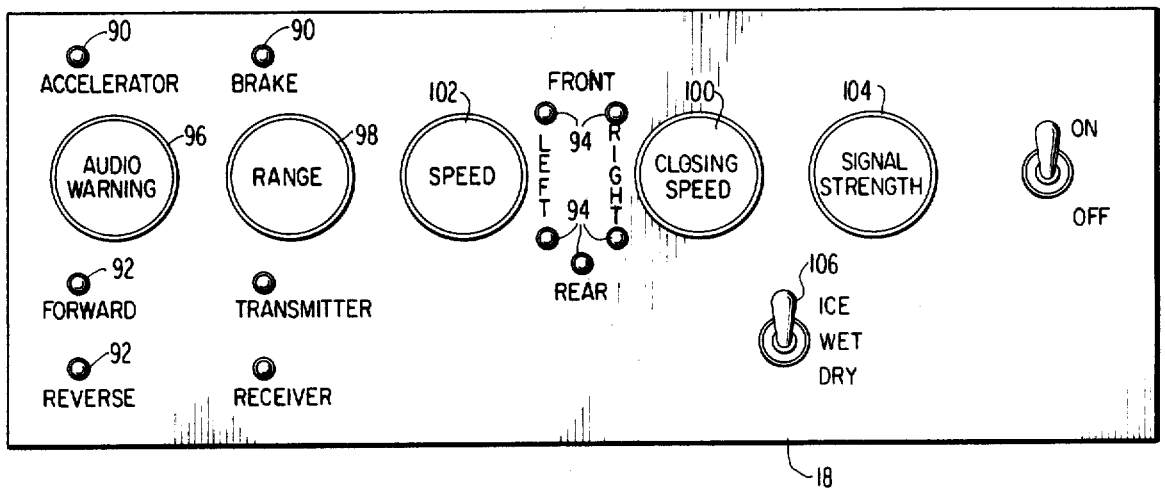
FIG. 6 is a plan view of the indicator panel used for indicating, to the driver of the vehicle, the presence of objects surrounding the vehicle, in accordance with the preferred embodiment.

FIG. 6 is a diagram of the face of operator control and display console 18. Lights 90 indicate if the accelerator and brake control signal generator 30 is generating a signal which is applied to the accelerator and brake control actuator 32. Indicator lights 92 indicate the position of the gear shift in accordance with gear shift position transducer 38. Indicator lights 94 indicate the detection of an object in relation to the vehicle. Audio warning 96 produces a warning just prior to the vehicle's reaching a distance which is too close to an object in front. Range indicator 98 and closing speed indicator 100 produce signals indicative of the range and closing speed with respect to an object to the front or rear of the vehicle in accordance with the output of the Doppler radar 20. Speed indicator 102 produces an output in accordance with vehicle velocity computer 26. Signal strength indicator 104 produces an output in accordance with the strength of a signal received by side sensors 16. Weather switch 106 is used to provide an input to the control system computer 28 in accordance with existing weather conditions. The type of weather input will be discussed below in the description of the control system computer.

FIG. 7 is a block diagram of the control system computer 28. The inputs to the control system computer are received from radar range computer 60, vehicle velocity computer 26, radar closing speed computer 62, a safety factor generator 108 and a threshold bias adjuster 110. The control system computer is used to compute the distances required, under existing road conditions, to stop the vehicle prior to its collision with an object in front of the vehicle.

The first factor computed is $R_a$ which is the distance of one average vehicle length for every 10 miles per hour traveled by the vehicle, times a gain factor which is dependent upon existing road conditions:

$$R_a = \frac{V}{10}(L_a)(G_a)$$

where:
$V$ = the vehicle velocity as computed by vehicle velocity computer 26
$L$ = the approximate length of the vehicle
$G_a$ = a first gain factor dependent upon existing road conditions The second factor computed by the control system computer is $R_b$ which is a factor which takes into consideration the distance traveled by the vehicle during the reaction time of the driver:

$$R_b = V(T_r)(K_r)(G_b)$$

where:
$V$ = vehicle velocity
$T_r$ = average reaction time of the driver
$K_r$ = 1.5 feet per mile-second
$G_b$ = a second gain factor dependent upon the existing road conditions The third factor computed by the control system computer is $R_c$ which takes into consideration the closing velocity of the vehicle on the object in front of it, that is, the relative velocity of the vehicle with respect to the object in front of it.

$$R_c = V_c(G_c)$$

where:
$V_c$ = the closing speed of the vehicle with respect to an object in front of it as computed by radar closing speed computer 62
$G_c$ = a third gain factor depending on existing weather conditions A fourth factor is a safety factor $R_s$ which provides an extra distance such as five feet to further insure that the vehicle does not collide with an object in front of it. The inclusion of this factor means that a warning and automatic brake and accelerator control are produced if the vehicle will not stop within five feet of an object in front of it. The safety factor may be changed to any value.

The fifth factor is the thresholf bias adjust $R_t$.

The gain factors for various weather conditions have been developed by using computer simulations and actual road tests. Typical gain factors are shown in the following chart:

| Condition | $G_a$ | $G_b$ | $G_c$ |
|---|---|---|---|
| Normal | 1 | 1 | 2.5 |
| Wet | 2 | 2 | 4 |
| Ice | 4 | 4 | 6 |

The selection of normal, wet or ice conditions is made, by the driver, with switch 106 located on the operator control and display console 18. As can be seen, the different weather conditions will effect the distance that the vehicle must maintain from an object in front of it. The worse the road condition, the greater the distance must be in order to allow the vehicle to stop.

The various distance factors are all added together and subtracted from the actual distance of the vehicle to the object in front of it as determined by radar range computer 60. If the difference between the actual range and all of the distance factors is negative, then the vehicle is too close to the object in front of it and a warning signal is produced and a signal is generated by accelerator and brake control signal generator 30. If the difference between the actual range and the various factors is positive, then the vehicle is a safe distance from the object in front of it. The equation of the system is the subtraction of the various factors from the actual range and may be computed as follows:

$$R_T = R_r - R_a - R_b - R_c - R_s + R_t$$

where:
$R_r$ = the range output of the radar range computer

The control system computer 28 includes operational amplifiers 112, 114 and 116. The gain factor applicable to each of the distance factors is the gain of the respective operational amplifier and is produced by resistance networks 118, 120 and 122, respectively. The gain factors may be changed by moving switch 106 to the appropriate position. This moves arms 124, 126 and 128 to the position corresponding to the selected gain factor. The outputs of the operational amplifiers are applied to summing circuits 130, 132, 134, 136 and 138. The output of summing circuit 134 is fed through operational amplifier 140, having a gain of −1, so that the necessary subtraction from the range computed by radar range computer 60 may be effected.

A typical example of the operation of the control system computer is as follows:

Weather dry
$G_a = 1$
$G_b = 1$
$G_c = 2.5$
Vehicle speed 70 mph
Vehicle in front traveling at 40 mph
Vehicle closing speed equals 30 mph
Vehicle length equals 12 feet
Reaction time 0.5 seconds
$K_r = 1.5$ ft. per mile per hour seconds $$R_a = \frac{V}{10}(L_a)(G_a)$$
$$= \frac{70}{10}(12)(1) = 84 \text{ ft.}$$

$R_b = V(T_r)(K_r)(G_b)$
$= 70(0.5)(1.5)(1) = 52.5$ ft.
$R_c = V_c(G_c)$
$= 30(2.5) = 75$ ft.
$R_s = 5$
$R_t = 0$
$R_T = R_r - R_a - R_b - R_c - R_s + R_t$
$= R_r - 84 - 52.5 - 75 - 5 + 0 = R_r = 216.5$ ft.

If the actual range to the vehicle in front is less than 216.5 ft., then the vehicle, if it has to stop suddenly, will collide with the vehicle in front. Therefore, the control system computer will produce an output which will activate accelerator and brake control signal generator 24 to apply a signal to the accelerator and brake control actuators 32. Also, a signal will be applied to the operator control and display console to produce an indication that the vehicle is too close to the vehicle in front. This indication is actually produced just prior to the generation of the signal by the accelerator and brake control signal generator.

If weather conditions were different then different gain factors would be substituted for those used in the above example and a different distance would be required to maintain the vehicle at a safe distance behind a vehicle in front.

Although the preferred embodiment uses radar sensors for detecting objects around the vehicle, it is readily apparent that laser, optical, magnetic or other proximity detection techniques could be used. Furthermore, although the preferred embodiment uses an analog computer, digital computers could also be used.

While the invention has been particularly shown and described with reference to the preferred embodiment thereof, it will be understood by those skilled in the art that various changes in form and detail may be made therein without departing from the spirit and scope of the invention.

What is claimed is:

1. A vehicle safety system for detecting the presence of objects in the vicinity of said vehicle and for producing an indication upon the detection of said objects, said system comprising:
   a. front sensor means for detecting objects in front of said vehicle;
   b. rear sensor means for detecting objects to the rear of said vehicle;
   c. side sensor means for detecting objects along-side of said vehicle;
   d. vehicle velocity sensor means for sensing the velocity of said vehicle and for producing an output indicative of said vehicle velocity;
   e. signal processing means for receiving the output of said front sensor means, said rear sensor means, and said vehicle velocity sensor means and for producing a first output indicative of the vehicle's capability of stopping prior to colliding with an object detected in front of said vehicle, and for producing a second output indicative of the presence of an object to the rear of said vehicle; and
   f. indicator means, coupled to said signal processing means, for receiving said first and second outputs, and coupled to said side sensor means for receiving the output therefrom, said indicator means producing indications indicative of the vehicle's capability of stopping prior to colliding with a detected object in front of said vehicle, indicative of the detection of an object to the rear of said vehicle and indicative of the detection of an object alongside of said vehicle,
   g. speed control means coupled to said signal processing means for producing a signal for slowing down said vehicle when the vehicle's capability of stopping, prior to colliding with an object detected in front of said vehicle, reaches a predetermined point,
wherein said signal processing means comprises:
   a. radar means coupled to said front sensor means and/or said rear sensor means for producing a range output indicative of the range of an object detected by said front sensor means and/or said rear sensor means and for producing a closing speed output indicative of the closing speed of an object detected by said front sensor means and/or said rear sensor means;
   b. vehicle velocity computer means coupled to said vehicle velocity sensor means for computing said vehicle velocity and for producing a velocity output;
   c. control computer means coupled to said radar means and said velocity computer means for computing said first output; and
   d. wherein the range output and closing speed output associated with said rear sensor means comprises said second output, and wherein said control computer means comprises:
   a. a first computing means for computing a first factor:

$$R_a = \frac{V}{10}(L)(G_a)$$

where:
   $V$ = said velocity output;
   $L$ = approximate vehicle length;
   $G_a$ = first gain factor;
   b. second computing means for computing a second factor:

$$R_b = V(T_r)(K_r)(G_b)$$

where:

$V$ = said velocity output;
$T_r$ = reaction time;
$K_r$ = 1.5 feet/mph-sec.
$G_b$ = second gain factor;

c. third computing means for computing a third factor:

$$R_c = V_c(G_c)$$

where:
$V_c$ = said closing speed output
$G_c$ = third gain factor;

d. fourth computing means for generating a fourth factor:
$R_s$ = predetermined safety factor; and e. fifth computing means for computing the sum:

$$R_T = R_r - R_a - R_b - R_c - R_s$$

where:
$R_r$ = said range output.

2. The system as set forth in claim 1 wherein
   a. said first, second and third computing means each comprise an operational amplifier; and
   b. said fifth computing means comprises summing means.

3. The system as set forth in claim 1 wherein said control computer means includes means for varying $G_a$, $G_b$ and $G_c$ in accordance with road and weather conditions.

4. A vehicle safety system for detecting the presence of objects in the vicinity of said vehicle and for producing an indication upon the detection of said objects, said system comprising:
   a. front sensor means for detecting objects in front of said vehicle;
   b. vehicle velocity sensor means for sensing the velocity of said vehicle and for producing an output indicative of said vehicle velocity;
   c. signal processing means for receiving the output of said front sensor means, and said vehicle velocity sensor means and for producing a first output indicative of the vehicle's capability of stopping prior to colliding with an object detected in front of said vehicle;
   d. indicator means coupled to said signal processing means for receiving said first output, said indicator means producing indications indicative of the vehicle's capability of stopping prior to colliding with a detected object in front of said vehicle;
   e. speed control means coupled to said signal processing means for producing a signal for slowing down said vehicle when the vehicle's capability of stopping, prior to colliding with an object detected in front of said vehicle, reaches a predetermined point, wherein said signal processing means comprises:

a. radar means coupled to said front sensor means for producing a range output indicative of the range of an object detected by said front sensor means and for producing a closing speed output indicative of closing speed of an object detected by said front sensor means;

b. vehicle velocity computer means coupled to said vehicle velocity sensor means for computing said vehicle velocity and for producing a velocity output;

c. control computer means coupled to said radar means and said velocity computer means for computing said first output;

and wherein said control computer means comprises:
a. a first computing means for computing a first factor:

$$R_a = \frac{V}{10}(L)(G_a)$$

where:
$V$ = said velocity output; $L$ = approximate vehicle length;
$G_a$ = first gain factor;

b. second computing means for computing a second factor:

$$R_b = V(T_r)(K_r)(G_b)$$

where:
$V$ = said velocity output;
$T_r$ = reaction time
$K_r$ = 1.5 feet/mph-sec.
$G_b$ = second gain factor;

c. third computing means for computing a third factor:

$$R_c = V_c(G_c)$$

where:
$V_c$ = said closing speed output; $G_c$ = third gain factor;

d. fourth computing means for generating a fourth factor:
$R_s$ = predetermined safety factor; and e. fifth computing means for computing the sum:

$$R_T = R_r - R_a - R_b - R_c - R_s$$

where:
$R_r$ = said range output.

5. The system as set forth in claim 4 including a manually operated switch coupled to said control computer for varying said gain factors $G_a$, $G_b$, and $G_c$.

* * * * *